(12) United States Patent
Yan et al.

(10) Patent No.: US 11,516,020 B2
(45) Date of Patent: Nov. 29, 2022

(54) KEY MANAGEMENT METHOD, APPARATUS, AND SYSTEM, STORAGE MEDIUM, AND COMPUTER DEVICE

(71) Applicant: TENCENT TECHNOLOGY (SHENZHEN) COMPANY LIMITED, Shenzhen (CN)

(72) Inventors: Peng Yan, Shenzhen (CN); Guangyuan Bai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 215 days.

(21) Appl. No.: 16/926,317

(22) Filed: Jul. 10, 2020

(65) Prior Publication Data
US 2020/0344072 A1 Oct. 29, 2020

Related U.S. Application Data

(63) Continuation of application No. PCT/CN2019/083875, filed on Apr. 23, 2019.

(30) Foreign Application Priority Data

Jun. 6, 2018 (CN) .......................... 201810574128.7

(51) Int. Cl.
*H04L 9/32* (2006.01)
*H04L 9/08* (2006.01)
(Continued)

(52) U.S. Cl.
CPC .......... *H04L 9/3265* (2013.01); *H04L 9/0894* (2013.01); *H04L 9/30* (2013.01);
(Continued)

(58) Field of Classification Search
CPC ....... H04L 9/3265; H04L 9/0894; H04L 9/30; H04L 9/3231; H04L 9/3247; H04L 9/3268; H04L 2209/38; H04L 9/3263
See application file for complete search history.

(56) References Cited

U.S. PATENT DOCUMENTS 6,233,685 B1 * 5/2001 Smith ...................... G06F 21/34
713/193
8,140,843 B2 * 3/2012 Holtzman ............. H04L 9/3273
713/156
(Continued)

FOREIGN PATENT DOCUMENTS

CA 3053313 A1 * 8/2018 ............. G06F 21/30
CN 1653460 A * 8/2005 ............. G06F 21/51
(Continued)

OTHER PUBLICATIONS

Japanese Office Action dated Oct. 18, 2021 in Japanese Application No. 2020-546477 (with English Office Action Summary).
(Continued)

*Primary Examiner* — Shahriar Zarrineh
(74) *Attorney, Agent, or Firm* — ArentFox Schiff LLP

(57) ABSTRACT

In a key management method performed by a terminal, a device key including a device public key and a device private key is generated in a security zone. A local device parameter and the device public key are transmitted to a certificate authentication server. A device certificate fed back by the certificate authentication server is received by the terminal. The signature data of the device certificate is generated by signing the device parameter and the device public key by using an authentication private key of the certificate authentication server. The terminal then stores the device private key and the device certificate in the security zone.

20 Claims, 9 Drawing Sheets

(51) Int. Cl.
  *H04L 9/30* (2006.01)
  *H04L 9/00* (2022.01)
(52) U.S. Cl.
  CPC .......... *H04L 9/3231* (2013.01); *H04L 9/3247* (2013.01); *H04L 9/3268* (2013.01); *H04L 9/50* (2022.05)

(56) References Cited

U.S. PATENT DOCUMENTS

| | | | | |
|---|---|---|---|---|
| 8,341,709 | B2 * | 12/2012 | Mok | H04W 12/106 |
| | | | | 713/157 |
| 9,083,531 | B2 * | 7/2015 | Chenna | H04L 9/3263 |
| 11,296,933 | B1 * | 4/2022 | Herrero | G06F 21/44 |
| 2005/0076198 | A1 * | 4/2005 | Skomra | H04L 63/0823 |
| | | | | 713/156 |
| 2007/0136574 | A1 * | 6/2007 | Oh | H04L 63/0442 |
| | | | | 713/156 |
| 2009/0202078 | A1 * | 8/2009 | Bar-El | G06F 21/10 |
| | | | | 380/277 |
| 2010/0100731 | A1 * | 4/2010 | Mok | H04L 9/3265 |
| | | | | 713/157 |
| 2012/0314856 | A1 * | 12/2012 | Zaverucha | H04L 9/007 |
| | | | | 380/44 |
| 2016/0337341 | A1 * | 11/2016 | Purusothaman | H04L 63/20 |
| 2017/0118196 | A1 * | 4/2017 | Ponsini | H04L 9/3234 |
| 2017/0171187 | A1 * | 6/2017 | Yin | H04L 63/083 |
| 2017/0257213 | A1 * | 9/2017 | Li | H04L 9/3247 |
| 2018/0091312 | A1 * | 3/2018 | Thom | H04L 9/3247 |
| 2018/0096137 | A1 * | 4/2018 | Trostle | G06F 21/53 |
| 2018/0247304 | A1 * | 8/2018 | Song | G06Q 20/3821 |
| 2019/0109877 | A1 * | 4/2019 | Samuel | H04L 63/123 |
| 2019/0245682 | A1 * | 8/2019 | Alwen | H04L 9/0844 |
| 2022/0094547 | A1 * | 3/2022 | Duchastel | H04L 9/0891 |

FOREIGN PATENT DOCUMENTS

| | | | | | |
|---|---|---|---|---|---|
| CN | 1801029 | | 7/2006 | | |
| CN | 100346249 | | 10/2007 | | |
| CN | 101777978 | | 7/2010 | | |
| CN | 101194461 | B * | 12/2011 | ........... | H04L 9/3263 |
| CN | 103916848 | A * | 7/2014 | ........... | H04L 9/3263 |
| CN | 105704123 | | 6/2016 | | |
| CN | 105743855 | | 7/2016 | | |
| CN | 105808359 | A * | 7/2016 | ............. | G06F 21/10 |
| CN | 106209730 | A * | 12/2016 | ........... | H04L 9/0822 |
| CN | 106533691 | | 3/2017 | | |
| CN | 107104795 | | 8/2017 | | |
| CN | 107392588 | | 11/2017 | | |
| CN | 108183804 | A * | 6/2018 | ........... | H04L 9/3226 |
| CN | 108667781 | A * | 10/2018 | | |
| CN | 108768664 | | 11/2018 | | |
| CN | 108880788 | A * | 11/2018 | ............. | G05B 19/406 |
| CN | 109218263 | A * | 1/2019 | ............... | G07C 9/00 |
| CN | 109474432 | A * | 3/2019 | ......... | H04L 63/0428 |
| CN | 110278084 | A * | 9/2019 | ......... | H04L 61/3015 |
| CN | 110417554 | A * | 11/2019 | | |
| CN | 110445614 | A * | 11/2019 | ............. | H04L 67/14 |
| CN | 108476226 | B * | 6/2021 | ............. | H04L 29/06 |
| FI | 108389 | B * | 1/2002 | | |
| GB | 2566263 | A * | 3/2019 | ............. | G06F 21/44 |
| JP | 2002-541528 | | 12/2002 | | |
| JP | 2006260015 | A * | 9/2006 | | |
| JP | 2009-89390 | | 4/2009 | | |
| JP | 2010-503252 | | 1/2010 | | |
| JP | 2011151679 | A * | 8/2011 | ........... | H04L 9/3265 |
| JP | 2013-150179 | | 8/2013 | | |
| JP | 2014-207510 | | 10/2014 | | |
| JP | 2017-175226 | | 9/2017 | | |
| KR | 20090026357 | A * | 3/2009 | | |
| KR | 101821645 | B1 * | 7/2017 | | |
| KR | 20170087678 | A * | 1/2018 | | |
| WO | WO-0225409 | A2 * | 3/2002 | ............. | G06F 21/10 |
| WO | WO 2014/110877 | A1 | 7/2014 | | |
| WO | WO 2015/108410 | A1 | 7/2015 | | |
| WO | WO-2018177045 | A1 * | 10/2018 | ............. | H04L 29/06 |
| WO | WO-2019047927 | A1 * | 3/2019 | ......... | H04L 63/0428 |

OTHER PUBLICATIONS

M. Iida et al. "The Proposal of a PKI-based System Design for IoT", Computer Security Symposium 2016, Oct. 11-13, 2016, pp. 602-608.

A. Shinoda et al. "SSL Client Authentication with TPM—Issuance of Public Key Certificate with OpenID and Terminal Authentication with SSL Client Certificate", IEICE Technical Report ICSS2013-66(Mar. 2014), 2014, 8 pages (with English Abstract).

Chinese Office Action dated Jan. 3, 2020 in Chinese Patent Application No. 201810574128.7 (with Concise English Translation).

International Search Report Issued in Application PCT/CN2019/083875 dated Jul. 26, 2019, with English Machine Translation (5 pages).

Written Opinion Issued in Application PCT/CN2019/083875 dated Jul. 26, 2019 (4 pages).

* cited by examiner

KEY MANAGEMENT METHOD, APPARATUS, AND SYSTEM, STORAGE MEDIUM, AND COMPUTER DEVICE

RELATED APPLICATION

This application is a continuation of International Application No. PCT/CN2019/083875, filed Apr. 23, 2019, which claims priority to Chinese Patent Application No. 201810574128.7, entitled "KEY MANAGEMENT METHOD, APPARATUS, AND SYSTEM, STORAGE MEDIUM, AND COMPUTER DEVICE", filed on Jun. 6, 2018. The entire disclosures of the prior applications are hereby incorporated by reference in their entirety.

FIELD OF THE TECHNOLOGY

The present disclosure relates to the field of computer technologies, such as key management technologies.

BACKGROUND OF THE DISCLOSURE

With the continuous development of Internet technologies, increasingly more data interaction is performed through devices. Therefore, a user requires higher device authentication security. Currently, a device manufacturer is required to separately establish a server for key management. Before a device leaves a factory, a device public key is uploaded to the server for storage.

However, in the related key management methods, each device manufacturer needs to separately establish a server for key management. When data interaction is required, an interacting party that needs to use the device public key needs to request the device public key from the server, causing the key management to be complex and inefficient.

SUMMARY

In exemplary aspects, in a key management method performed by a terminal, a device key including a device public key and a device private key is generated in a local security zone with circuitry. A local device parameter and the device public key are transmitted by the circuitry of the terminal to a certificate authentication server. A device certificate fed back by the certificate authentication server is received by the circuitry of the terminal. Signature data of the device certificate is generated by signing the device parameter and the device public key by using an authentication private key of the certificate authentication server. The device private key and the device certificate are stored by the circuitry of the terminal in the security zone.

In exemplary aspects, in a case that an application key generating instruction triggered by an application running locally is obtained, an application key of the application is generated in the security zone. The application key includes an application public key and an application private key. An application certificate of the application in the security zone is generated by signing an application parameter of the application and the application public key by using the device private key. The application private key and the application certificate are correspondingly stored in the security zone.

In exemplary aspects, in the generating of the application certificate, digest information of the application parameter of the application and the application public key is obtained. The digest information is encrypted by using the device private key to obtain signature data. The application certificate of the application is generated according to the signature data obtained through encryption.

In exemplary aspects, an authentication certificate including an authentication public key corresponding to the authentication private key is obtained. The authentication certificate, the device certificate, and the application certificate are used as a certificate chain of the application. The certificate chain is stored in the security zone.

In exemplary aspects, in a case that a biometric authentication authorization request triggered by the application is received, an application certificate verification request corresponding to the application is generated. The certificate chain of the application and the application certificate verification request are correspondingly transmitted to an application server corresponding to the application. A verification result fed back by the application server is received after verifying the received certificate chain according to an authentication certificate stored in the application server. The application a permission of biometric authentication is granted in a case that the verification result indicates that the verification succeeds.

In exemplary aspects, a verification result that is fed back is received in a case that the application server does not store the authentication certificate and that is obtained from the certificate authentication server through a secure channel.

In exemplary aspects, the verification result is obtained by verifying the certificate chain according to an authentication certificate stored in the certificate authentication server after the certificate authentication server receives, through the secure channel, the certificate chain uploaded by the application server.

In exemplary aspects, in a certificate verification method performed by a certificate authentication server, an application certificate verification request is received by circuitry of the server. A certificate chain corresponding to the application certificate verification request is obtained by the circuitry of the server. The certificate chain includes an authentication certificate, a device certificate, and an application certificate. The device certificate and the application certificate are verified by the circuitry of the server according to the authentication public key of the authentication certificate in the certificate chain in a case that there is a local authentication certificate consistent with the authentication certificate in the certificate chain. In a case that both the device certificate and the application certificate pass the verification, a verification result is fed back by the circuitry of the server indicating that the verification succeeds.

In exemplary aspects, an authentication private key corresponding to the authentication certificate is used for signing to generate signature data of the device certificate. An authentication public key of the authentication certificate is used for decrypting the signature data of the device certificate. A device private key corresponding to the device certificate is used for signing to generate signature data of the application certificate, and a device public key of the device certificate being used for decrypting the signature data of the application certificate.

In exemplary aspects, in the verifying, the authentication certificate in the certificate chain is queried in an authentication certificate revocation list. In a case that the authentication certificate in the certificate chain does not exist in the authentication certificate revocation list, the authentication certificate is locally queried consistent with the authentication certificate in the certificate chain. The device certificate is verified according to the authentication public key of the authentication certificate in the certificate chain in a case that the authentication certificate consistent with the authentication certificate in the certificate chain is found. The application certificate is verified according to the device public key of the device certificate in a case that the device certificate passes the verification.

In exemplary aspects, a device parameter and the device public key are received, and digest information of the device parameter and the device public key is obtained. The digest information is encrypted by using the authentication private key to obtain signature data. The device certificate is generated and fed back according to the signature data obtained through encryption.

In exemplary aspects, a key management system includes a terminal and a certificate authentication server. The terminal includes circuitry that generates, in a local security zone, a device key including a device public key and a device private key, and transmits a local device parameter and the device public key to the certificate authentication server. The certificate authentication server includes circuitry that feeds back a device certificate to the terminal. Signature data of the fed back device certificate is generated by the certificate authentication server by signing the device parameter and the device public key by using an authentication private key of the certificate authentication server. The terminal stores the device private key and the device certificate in the security zone.

In an exemplary aspect, the system includes an application server, and the circuitry of the terminal generates a certificate chain of an application running locally. The circuitry of the terminal also generates, in a case that a biometric authentication authorization request triggered by the application is received, an application certificate verification request corresponding to the application, and correspondingly transmits the certificate chain of the application and the application certificate verification request to the application server corresponding to the application. The application server includes circuitry that feeds back, in a case that an authentication certificate in the certificate chain is stored, a verification result to the terminal after the received certificate chain is verified according to the stored authentication certificate. The circuitry of the application server also transfers the certificate chain to the certificate authentication server through a secure channel in a case that the authentication certificate in the certificate chain is not stored, obtains, from the certificate authentication server, a verification result that is obtained by the certificate authentication server by verifying the certificate chain, and feeds back the verification result to the terminal.

In an exemplary aspect, the certificate chain includes an authentication certificate, a device certificate, and an application certificate. An authentication private key corresponding to the authentication certificate is used for signing to generate the signature data of the device certificate. An authentication public key of the authentication certificate is used for decrypting the signature data of the device certificate. A device private key corresponding to the device certificate is used for signing to generate signature data of the application certificate, and a device public key of the device certificate is used for decrypting the signature data of the application certificate.

In an exemplary aspect, the circuitry of the terminal generates, in a case that an application key generating instruction triggered by an application running locally is obtained, an application key of the application in the security zone. The application key includes an application public key and an application private key. The circuitry of the terminal also generates an application certificate of the application in the security zone by signing an application parameter of the application and the application public key by using the device private key, and correspondingly stores the application private key and the application certificate in the security zone.

In exemplary aspects, the circuitry of the terminal obtains digest information of the application parameter of the application and the application public key, encrypts the digest information by using the device private key to obtain signature data, and generates the application certificate of the application according to the signature data obtained through encryption.

In exemplary aspects, the circuitry of the terminal obtains an authentication certificate including an authentication public key corresponding to the authentication private key, uses the authentication certificate, the device certificate, and the application certificate as a certificate chain of the application, and stores the certificate chain in the security zone.

In an exemplary aspect, the circuitry of the terminal receives a verification result that is fed back in a case that the application server does not store the authentication certificate and that is obtained from the certificate authentication server through a secure channel. The verification result is obtained by verifying the certificate chain according to an authentication certificate stored in the certificate authentication server after the certificate authentication server receives, through the secure channel, the certificate chain uploaded by the application server.

In an exemplary aspect, a non-transitory computer-readable storage medium is provided. The non-transitory computer-readable medium is encoded with computer-readable instructions that, when executed by a processor, cause the processor to perform a method in which an application certificate verification request is received. A certificate chain corresponding to the application certificate verification request is obtained. The certificate chain includes an authentication certificate, a device certificate, and an application certificate. The device certificate and the application certificate are verified according to the authentication public key of the authentication certificate in the certificate chain in a case that there is a local authentication certificate consistent with the authentication certificate in the certificate chain. In a case that both the device certificate and the application certificate pass the verification, a verification result is fed back indicating that the verification succeeds.

In an exemplary aspect, a non-transitory computer-readable storage medium is provided. The non-transitory computer-readable storage medium is encoded with computer-readable instructions that, when executed by a processor, cause the processor to perform a method in which a device key including a device public key and a device private key is generated in a local security zone. A local device parameter and the device public key are transmitted to a certificate authentication server. A device certificate fed back by the certificate authentication server is received. Signature data of the device certificate is generated by signing the device parameter and the device public key by using an authentication private key of the certificate authentication server. The device private key and the device certificate are stored in the security zone.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, which correspond to exemplary embodiments.

DETAILED DESCRIPTION

To make the objectives, technical solutions, and advantages of the present disclosure clearer and more understandable, the following descriptions of exemplary embodiments and the accompanying drawings is provided. It is to be understood that these descriptions are only exemplary and not limiting upon the present disclosure.

Figure 1:
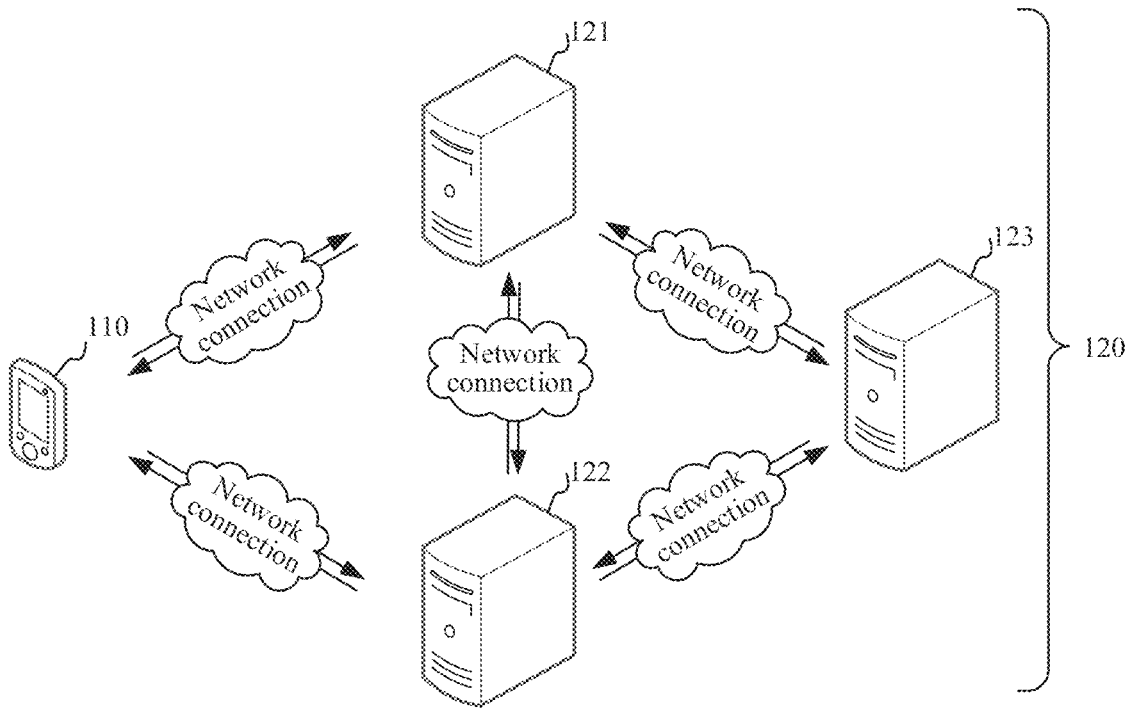
FIG. 1 is a diagram of an application environment of a key management method in according to an exemplary embodiment of the present disclosure.

FIG. 1 is a diagram of an application environment of a key management method according to an exemplary embodiment. Referring to FIG. 1, the key management method is applied to a key management system. The key management system includes a terminal 110 and a server 120. The server 120 includes at least a certificate authentication server 121, and may further include an application server 122 and/or a key management server 123. The terminal 110 is connected to the server 120 through a network. The terminal 110 is configured to perform the key management method. The terminal 110 may be a desktop terminal or a mobile terminal, and the mobile terminal may be at least one of a mobile phone, a tablet computer, a notebook computer, or the like. The certificate authentication server 121 may be a certificate authority (CA) server or a server of another type. The application server 122 may be a server corresponding to an application running on the terminal 110, for example, an instant messaging server corresponding to an instant messaging application, or the like. The key management server 123 may be a trusted ATTK management (TAM) server or a server of another type.

The terminal 110 may generate, in a local security zone, a device key including a device public key and a device private key, and then transmit a local device parameter and the device public key to the certificate authentication server 121. After receiving the device parameter and the device public key, the certificate authentication server 121 may generate signature data by signing the device parameter and the device public key by using an authentication private key of the certificate authentication server, to obtain a device certificate of the terminal 110, and feed back the device certificate to the terminal 110. Then, the terminal 110 stores the device private key and the device certificate in the security zone.

The terminal 110 may further generate, in a case that an application key generating instruction triggered by an application running locally is obtained, an application key of the application in the security zone, the application key including an application public key and an application private key. In the security zone, the terminal 110 generates an application certificate of the application by signing an application parameter of the application and the application public key by using the device private key, correspondingly stores the application private key and the application certificate in the security zone, and stores a certificate chain of the application, which includes an authentication certificate, the device certificate, and the application certificate. In this way, the terminal 110 generates, in a case that a biometric authentication authorization request triggered by the application is received, an application certificate verification request corresponding to the application, and correspondingly transmits the certificate chain of the application and the application certificate verification request to the application server 122 corresponding to the application. The application server 122 performs certificate verification, or after the application server 122 forwards the certificate chain to the certificate authentication server 121, the certificate authentication server 121 performs certificate verification. Alternatively, after the application server forwards the certificate chain to the key management server 123, the certificate authentication server 121 or the key management server 123 performs certificate verification.

In an exemplary embodiment, the certificate verification method may alternatively be applied to an application environment shown in FIG. 1. The server 120 is configured to perform the certificate verification method. After receiving an application certificate verification request transmitted by the terminal 110, the server 120 obtains a certificate chain corresponding to the application certificate verification request. The certificate chain includes an authentication certificate, a device certificate, and an application certificate. Therefore, an authentication private key corresponding to the authentication certificate is used for signing to generate signature data of the device certificate, and an authentication public key of the authentication certificate is used for decrypting the signature data of the device certificate. A device private key corresponding to the device certificate is used for signing to generate signature data of the application certificate, and a device public key of the device certificate is used for decrypting the signature data of the application certificate. In this case, the server 120 verifies the device certificate and the application certificate according to the authentication public key of the authentication certificate in the certificate chain in a case that there is an authentication certificate in the server 120 consistent with the authentication certificate in the certificate chain, and feeds back, in a case that both the device certificate and the application certificate pass the verification, a verification result indicating that the verification succeeds to the terminal 110.

Figure 2:
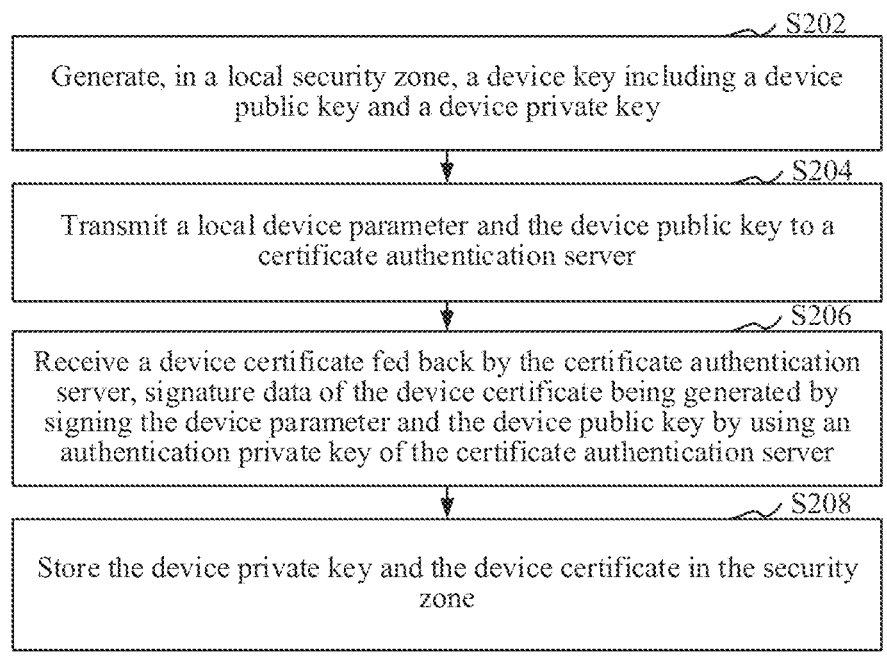
FIG. 2 is a schematic flowchart of a key management method according to an exemplary embodiment of the present disclosure.

FIG. 2 is a schematic flowchart of a key management method according to an exemplary embodiment. Description is made by using an example in which the key management method is applied to the terminal 110 in FIG. 1. Referring to FIG. 2, the method includes the following steps.

In step S202, a device key including a device public key and a device private key is generated in a local security zone. The security zone is a trusted execution environment independent of an operating system in the terminal. The security zone may be a Trusted Execution Environment (TEE). The security zone is a trusted environment used to ensure that data stored or processed inside the security zone is independent of an environment outside the security zone. For example, if an asymmetric key is generated in the security zone, a private key in the asymmetric key is not available to any other parties (terminal manufacturers, application servers, or the like) than a key owner. Certainly, the security zone may alternatively be another trusted zone that can ensure data security inside the terminal, which is not limited in this embodiment of this application.

The device key is data used for verifying terminal validity and ensuring data transmission security. The device key may alternatively be referred to as a terminal root key. In this embodiment of this application, the device key of the terminal is an asymmetric key including a device public key and a device private key. Data encrypted by the device public key may be decrypted by the device private key. Data encrypted by the device private key may be decrypted by the device public key. The device key may be an asymmetric key based on RSA-2048. Certainly, the device key may alternatively be another asymmetric key. Therefore, the key used is not limiting upon the present disclosure.

During data transmission between two data transmission parties, a transmitter needs to encrypt transmitted data by using the key, so that only a corresponding receiver having the key may decrypt the encrypted data, to obtain the data transmitted by the transmitter. Therefore, in an exemplary embodiment, when the data transmitter transmits data to the terminal, the data transmitter encrypts the transmitted data by using the device public key of the terminal. Normally, only the terminal itself owns the device private key of the terminal. Therefore, only the terminal may decrypt the encrypted data by using the device private key, to obtain the data transmitted by the data transmitter. Other devices, even if they can obtain the encrypted data, cannot decrypt the encrypted data successfully because the devices do not own the device private key of the terminal, and therefore cannot obtain the data transmitted by the data transmitter.

In an exemplary embodiment, the device key may be an attestation key (ATTK), The ATTK is used for verifying the validity of the terminal. One terminal has one and only one ATTK. Certainly, the device key may alternatively be another key, as one of ordinary skill would recognize. Therefore, the device key used is not limiting upon the present disclosure.

In an exemplary embodiment, the security zone of the terminal includes key generating code. The device key, including the device public key and the device private key, is generated in the security zone by running the key generating code.

When producing the terminal, the terminal manufacturer configures the security zone for the terminal. The terminal is allowed to leave the factory for sale only after the security zone configured for the terminal passes the acceptance. Optionally, before the terminal leaves the factory and after the security zone on the terminal passes the acceptance, the key generating code may be written into the security zone, and the key generating code generates, in the security zone, the device key including the device public key and the device private key.

In an exemplary embodiment, a security application may run in the security zone of the terminal. Both a logical behavior and a storage behavior of the security application are secure behaviors. The terminal may generate, through the security application running in the security zone, the device key including the device public key and the device private key. The security application may be a trusted application (TA). The device key may alternatively be generated in the secure area of the terminal in other manners, and the generation manner of the device key is not limiting upon the present disclosure.

In step S204, a local device parameter and the device public key are transmitted to a certificate authentication server. The device parameter is data reflecting a terminal identity. The device parameter may be a terminal identifier. The terminal identifier is used for uniquely identifying a terminal, for example, a terminal serial number. The certificate authentication server is an authoritative server used for authenticating a digital certificate. The digital certificate is used for proving that a user (a device, an application, or the like) listed in the certificate legitimately owns a public key (a device public key or an application public key, or the like) listed in the certificate. The certificate authentication server may be a CA server, that is, a server of a certificate authority.

The terminal may also read the local device parameter, that is, a device parameter of the terminal, generate a device certificate issuing request, and then correspondingly transmit the read device parameter, the generated device public key, and the device certificate issuing request to the certificate authentication server.

In step S206, a device certificate fed back by the certificate authentication server is received. Signature data of the device certificate is generated by signing the device parameter and the device public key by using an authentication private key of the certificate authentication server.

The device certificate is a document that is issued by the certificate authentication server after signing and that includes device public key owner information and the device public key. The device public key owner information is the device parameter. The device certificate may include plaintext of the device public key owner information and the device public key, that is, raw data on which signature processing has not been performed, or may include ciphertext of the device public key owner information and the device public key, that is, data obtained by signing the device public key owner information and the device public key. The signature data is data obtained by signing certain data by using a private key of a signer. That is, the certificate authentication server receives the device parameter and the device public key of the terminal, and generates the signature data by signing the device parameter and the device public key by using the authentication private key of the certificate authentication server, to form the device certificate, and feeds back the device certificate to the terminal.

In an exemplary embodiment, the device certificate includes the device parameter, the device public key and the ciphertext generated by signing the device parameter and the device public key by using the authentication private key. Herein, the signature data of the device certificate may be only the ciphertext, or may be a combination of the device parameter, the device private key, and the ciphertext.

In an exemplary embodiment of the present disclosure, the device certificate conforms to the X. 509 certificate standard. Both an authentication certificate and an application certificate involved subsequently in this application conform to the X. 509 certificate standard. The authentication certificate, the device certificate, and the application certificate may alternatively conform to other certificate standards, as one of ordinary skill would recognize. Therefore, the specific standard to which the device certificate conforms is not limiting upon the present disclosure.

After receiving the device parameter and the device public key transmitted by the terminal, the certificate authentication server may calculate digest information of the device parameter and the device public key by using a signature algorithm agreed upon with the terminal, and then encrypt the calculated digest information by using the private authentication private key of the certificate authentication server to obtain the signature data.

It may be mathematically ensured that as long as any bit in the data is changed, recalculated digest information of the data does not conform to the original digest information. Therefore, in an exemplary embodiment, by extracting the digest information and signing the digest information through encryption, immutability of the data can be ensured, and time consumption caused by encrypting and decrypting a large amount of data can be avoided. As can be appreciated, the device parameter and the device public key may alternatively be signed in other manners without limitation.

Even an asymmetric encryption system cannot ensure that distribution of the public key is reliable. To prevent a man-in-the-middle attack in the public key distribution process, a trusted "ancestor" notary is required, and this is the meaning of the existence of the certificate authentication server (that is, the CA server). In an exemplary embodiment of this application, the certificate in which the public key is located is issued through the certificate authentication server, or is issued based on the certificate authentication server, thereby fundamentally ensuring the reliability of the certificate in which the public key is located.

In step S208, the device private key and the device certificate are stored in the security zone. Before the terminal leaves the factory, the terminal may store the device private key and the device certificate in a secure memory area in the security zone of the terminal. The secure memory area is, for example, a relay protected memory block (RPM).

In an exemplary embodiment, one device has one and only one device key. Therefore, the device key and the device certificate may be stored correspondingly, or may be stored independently. The device private key and the device certificate may be stored simultaneously, or may be stored separately. That is, the device private key is stored after the device private key is generated, and the device certificate is stored after the device certificate is received.

The foregoing steps S202 to S208 are all performed in a secure trusted environment within a device production line. In an exemplary embodiment of this application, before the terminal leaves the factory, the device public key of the terminal no longer needs to be transmitted to the key management server by the terminal manufacturer through the secure channel, so that uploaded data cannot be tampered with in this manner. The device certificate is issued through the certificate authentication server. The security and the credibility of the device certificate are ensured by the certificate authentication server. Because a large quantity of devices may share one authentication certificate, management and maintenance costs of the device key are reduced.

In an exemplary embodiment, the terminal may further obtain an authentication certificate including an authentication public key corresponding to the authentication private key; use the authentication certificate and the device certificate as a certificate chain of the application; and store the certificate chain in the security zone. That is, for each certificate of the terminal, the terminal stores the certificate chain of the certificate in the security zone.

In the foregoing key management method, the device key is generated in the local security zone, and the private key in the device key and the device certificate are stored in the local security zone, so that security of the device key and the device certificate is ensured. Besides, the signature data of the device certificate is generated by signing the local device parameter and the device public key by using the authentication private key of the certificate authentication server, so that validity and credibility of the device certificate are enhanced. In addition, the device certificate is directly stored locally, thereby avoiding complex operations and inconvenience in management and use of the private key caused by storing the device public key in a non-local device, so that the key management is convenient and efficient.

Figure 3:
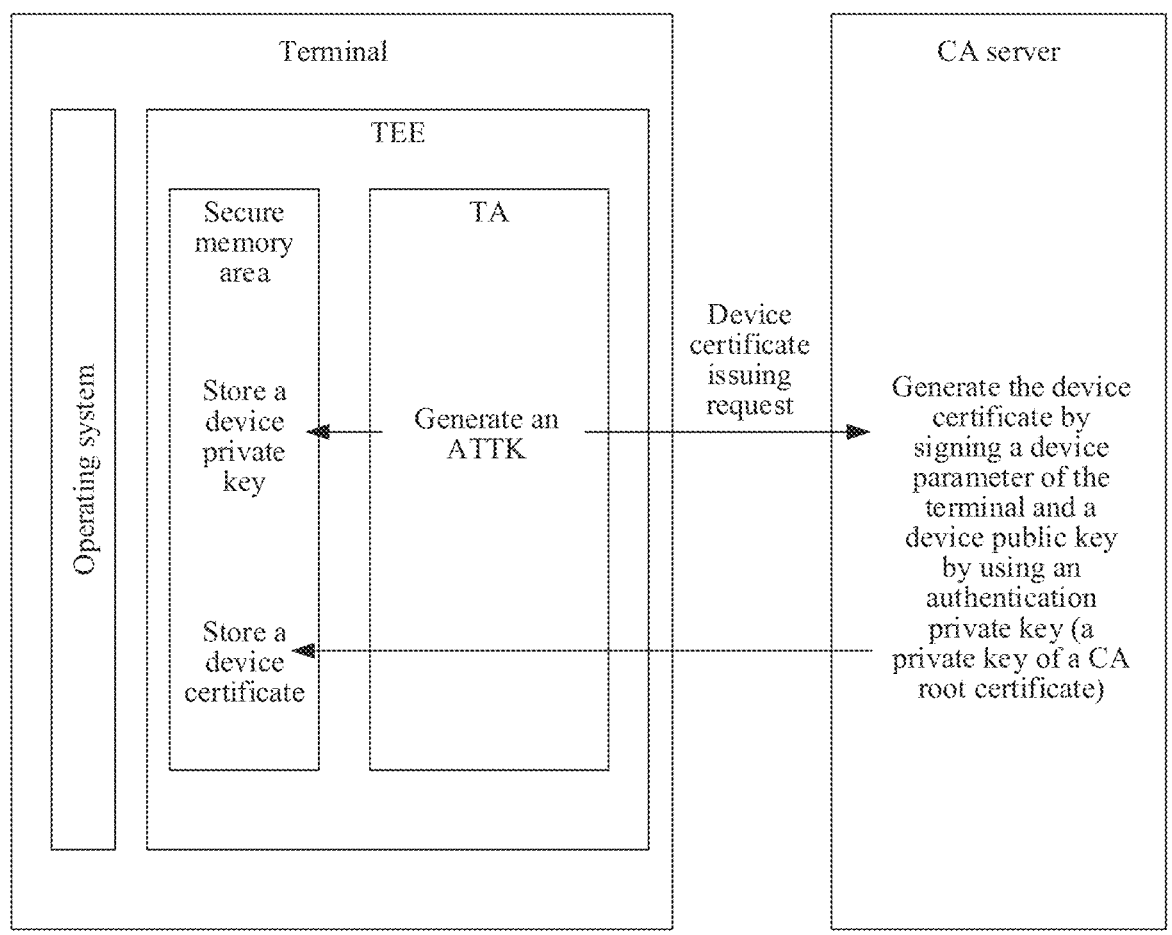
FIG. 3 is a sequence diagram of issuing a device certificate according to an exemplary embodiment of the present disclosure.

FIG. 3 is a sequence diagram of issuing a device certificate according to an exemplary embodiment. Referring to FIG. 3, before a terminal leaves the factory, a device key (ATTK) including a device public key and a device private key are generated through a trusted application (TA) running in a security zone (TEE). The TEE is an operating system independent of the terminal. The terminal stores the generated device private key in a secure memory area of the TEE, and transmits a device certificate issuing request to a certificate authentication server (CA server), where a device parameter of the terminal and the generated device public key are carried in the device certificate issuing request. After receiving the device certificate issuing request, the CA server generates a device certificate by signing the device parameter of the terminal and the device public key by using an authentication private key thereof (a private key of a CA root certificate), and then feeds back the generated device certificate to the terminal. The terminal then stores the device certificate in the security memory area of the TEE.

In an exemplary embodiment, in a case that an application key generating instruction triggered by an application running locally is obtained, an application key of the application in the security zone is generated. The application key includes an application public key and an application private key. An application certificate of the application in the security zone is generated by signing an application parameter of the application and the application public key by using the device private key, and the application private key is stored in correspondence with the application certificate in the security zone.

The application key generating instruction is a computer program used for instructing to generate an application key. The application key is data used for verifying application validity and ensuring data transmission security. In an exemplary embodiment, the application key is an asymmetric key, including the application public key and the application private key. Data encrypted by the application public key may be decrypted by the application private key. Data encrypted by the application private key may be decrypted by the application public key. The application key may be an asymmetric key based on RSA-2048. Certainly, the application key may alternatively be another asymmetric key. As such, the specific application key used is not limiting upon the present disclosure.

In an exemplary embodiment, the application key may be an App secure key (ASK). The ASK is used for verifying the validity of the application. One application has one and only one ASK. However, other application keys are possible without departing from the scope of the present disclosure.

One or more applications may run on the terminal, and each application has its own application public key and application private key. When the application on the terminal performs data interaction with an external device, the peer end encrypts transmitted data by using the application public key of the application. Normally, only the application itself owns the application private key of the application. Therefore, only the application may decrypt the encrypted data by using the application private key to obtain the data transmitted by the peer end. Other applications, even if they can obtain the encrypted data, cannot decrypt the encrypted data successfully because the applications do not own the application private key of the application, and therefore cannot obtain the data transmitted by the peer end.

When installing the application or running the application for the first time, the terminal may obtain the application key generating instruction triggered by the application, or the application key generating instruction triggered by installation code of the application. The terminal generates the application private key of the application in the local security zone, and generates the application certificate of the application in the security zone by signing the application parameter of the application and the application public key by using the device private key of the terminal. Then the terminal correspondingly stores the application private key and the application certificate in the security zone.

In an exemplary embodiment, in the generating of the application certificate, digest information of the application parameter of the application and the application public key is obtained, and the digest information is encrypted by using the device private key to obtain signature data. The application certificate of the application is generated according to the signature data obtained through encryption.

The digest information is a value that uniquely corresponds to a fixed length of data to which the digest information belongs. The digest information is generated by using an irreversible character string transformation algorithm that operates on the data to which the digest information belongs.

The terminal may use the application parameter of the application and the application public key as text information to generate digest information of the text information by using the irreversible character string transformation algorithm. The irreversible character string transformation algorithm may be a hash algorithm, or may be another algorithm, as one of ordinary skill would recognize. Certainly, other methods may also be used to generate the digest information of the application parameter of the application and the application public key without departing from the scope of the present disclosure.

Further, the terminal then encrypts the digest information by using the device private key to obtain the signature data, and generates the application certificate of the application. The application certificate may include plaintext of application public key owner information and the application public key, that is, raw data on which signature processing has not been performed, or may include ciphertext of the application public key owner information and the application public key, that is, data obtained by signing the application public key owner information and the application public key. The application public key owner information is the application parameter.

If the data changes during transmission, new digest information obtained by a receiver through calculation based on the received data does not conform to the original digest information. In this way, the receiver knows that the data has changed. Therefore, in an exempla embodiment, the digest information is encrypted. In a case that the integrity and security of transmitted data can be ensured through digest encryption, the complete transmitted data is no longer encrypted, thereby avoiding time consumption caused by encryption and decryption processes when a data volume is large. This ensures the data security, provides data processing efficiency, and facilitates a subsequent data processing process.

In an exemplary embodiment, an authentication certificate including an authentication public key corresponding to the authentication private key is obtained. The authentication certificate, the device certificate, and the application certificate are used as a certificate chain of the application, and the certificate chain is stored in the security zone.

The authentication certificate is a digital certificate held by the certificate authentication server. The certificate authentication server is an authority responsible for issuing and managing digital certificates, and as a trusted third party in an e-commerce transaction, is responsible for the validity check of a public key in a public key system. In this case, the authentication certificate is generally considered to be authoritative and trusted. In an exemplary embodiment of the present disclosure, the certificate authentication server may be a CA server, and the authentication certificate may be a CA root certificate.

Generally, one certificate authentication server holds one CA root certificate. The certificate authentication server performs a signing operation on to-be-signed data according to a private key of the CA root certificate held by the certificate authentication server. Certainly, one certificate authentication server may alternatively hold a plurality of CA root certificates, as one of ordinary skill would recognize.

After issuing the device certificate for the terminal, the certificate authentication server may issue the authentication certificate held by the certificate authentication server to the terminal. In this way, after issuing the device certificate by using the device private key, the terminal may form a certificate chain of the application consisting of the application certificate, the device certificate in which the device public key that corresponds to the device private key for issuing the application certificate is located, and the authentication certificate in which the authentication public key that corresponds to the authentication private key for issuing the device certificate is located, and store the certificate chain in the security zone of the terminal.

The device certificate is issued by the certificate authentication server, and the application certificate is issued according to the device certificate. Therefore, the application certificate is issued based on the certificate authentication server. That is, the certificate chain of the application certificate is a trust chain established based on the certificate authentication server, so that credibility of each certificate in the certificate chain is enhanced.

In an exemplary embodiment, for each certificate, a certificate chain of the certificate is established. In this way, when the validity of the certificates is to be checked subsequently, the certificate chain of the certificates is carried in a verification request, and then the validity of the certificates may be checked step by step. It is unnecessary to transmit a device public key to a dedicated key management server in advance and then request the server to check the validity of the certificates.

In an exemplary embodiment, the application key is generated in the local security zone, and the private key in the application key and the application certificate are also stored in the local security zone, so that the security of the application key and the application certificate is ensured. Besides, the signature data in the device certificate is generated through signing by using the device private key, and the device certificate in which the device public key corresponding to the device private key is located is issued by the certificate authentication server, so that the validity and credibility of the application certificate are enhanced.

Figure 4:
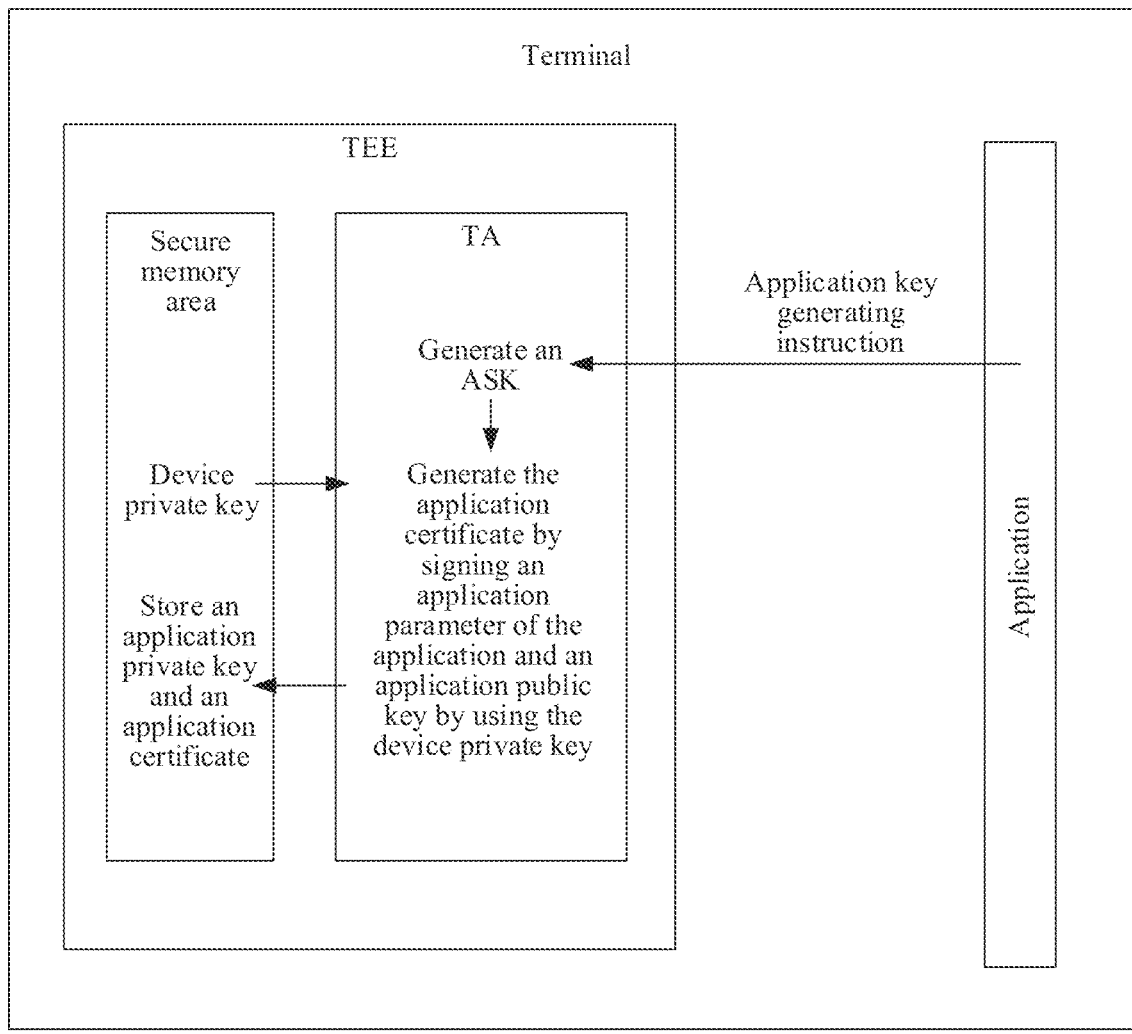
FIG. 4 is a sequence diagram of issuing an application certificate according to an exemplary embodiment of the present disclosure.

FIG. 4 is a sequence diagram of issuing an application certificate in an exemplary embodiment. Referring to FIG. 4, an application may run on the terminal. After being installed or running, the application may trigger an application key generating instruction. The terminal may generate an application key (ASK) including an application public key and an application private key by using a TA running in a TEE. Then, the terminal obtains a device private key from a secure memory area through the TA, generates an application certificate by signing an application parameter of the application and the application public key by using the obtained device private key, and then correspondingly stores the application private key and the application certificate in the secure memory area of the TEE. The terminal may further use an authentication certificate, a device certificate and the application certificate as a certificate chain of the application, and store the certificate chain in a security zone of the TEE.

In an exemplary embodiment, in a case that a biometric authentication authorization request triggered by the application is received, an application certificate verification request corresponding to the application is generated, and the certificate chain of the application and the application certificate verification request are correspondingly transmitted to an application server corresponding to the application. A verification result fed back by the application server is received after the application server verifies the received certificate chain according to an authentication certificate stored in the application server. The application a permission of biometric authentication is granted in a case that the verification result indicates that the verification succeeds.

The biometric authentication authorization request is used for requesting for ranting the permission of biometric authentication. The biometric authentication is a technology of performing, by a computer device, identity verification using biometric characteristics inherent to a natural person. The biometric authentication is, for example, fingerprint authentication, face recognition authentication, and iris recognition authentication. The application certificate verification request is used for requesting a validity check of the application certificate.

The application requests the terminal to grant the permission of biometric authentication, that is, the terminal requests obtaining data, which is stored in the terminal, of the biometric characteristics inherent to a user, for example, fingerprint data or face data. The data is specific biometric privacy of the user. To protect the biometric privacy of the user, the permission is granted only when the application has a valid request permission. That is, the permission of biometric authentication may be granted to the application only after the application certificate of the application passes the verification.

The application server receives the certificate chain of the application and the application certificate verification request. In a case that the application server stores an authentication certificate, the application server verifies the received certificate chain according to the authentication certificate, and feeds back a verification result to the terminal.

For example, when the user enables fingerprint payment on an instant messaging application of the terminal, the biometric authentication authorization request is triggered by the instant messaging application. In this case, the instant messaging application needs to transmit a certificate chain of the instant messaging application to an instant messaging server corresponding to the instant messaging application, and the instant messaging server checks the validity of the certificate in the certificate chain. Alternatively, the instant messaging server forwards the certificate chain to another server to check the validity of the certificate in the certificate chain. The terminal may grant the instant messaging application a permission of fingerprint recognition payment only after the validity check succeeds.

The terminal may generate, in a case that a biometric authentication authorization request triggered by the application is received, an application certificate verification request corresponding to the application, and may correspondingly transmit the certificate chain of the application and the application certificate verification request to the application server corresponding to the application.

After receiving the application certificate verification request, the application server obtains a certificate chain carried in the application certificate verification request, and locally queries whether an authentication certificate consistent with the authentication certificate in the certificate chain is stored. In a case that an authentication certificate consistent with the authentication certificate in the certificate chain is stored in the application server, it is determined that the authentication certificate in the certificate chain is valid.

Then, the application server decrypts the signature data of the device certificate according to the authentication public key of the authentication certificate to obtain first digest information, and extracts second digest information of a device parameter and the device public key of the device certificate according to a digest information extraction mode agreed upon with the terminal, to compare the first digest information and the second digest information. When the first digest information is inconsistent with the second digest information, it is determined that the device certificate is invalid, and a verification result indicating that the verification fails is fed back to the terminal.

When the first digest information is consistent with the second digest information, the application server continues to decrypt the signature data of the application certificate according to the device public key of the device certificate to obtain third digest information, and extracts fourth digest information of an application parameter and the application public key of the application certificate according to the digest information extraction mode agreed upon with the terminal, to compare the third digest information and the fourth digest information. When the third digest information is inconsistent with the fourth digest information, it is determined that the device certificate is invalid, and a verification result indicating that the verification fails is fed back to the terminal. When the third digest information is consistent with the fourth digest information, it is determined that the application certificate is valid, and the verification result indicating that the verification succeeds is fed back to the terminal. In this way, the terminal grants the application the permission of biometric authentication only in a case that the received verification result indicates that the verification succeeds.

The authentication certificate stored in the application server may be an authentication certificate that is held by each certificate authentication server and that is obtained in advance from each certificate authentication server through a secure channel. In a case that an authentication certificate consistent with the authentication certificate in the certificate chain may be found, it can be determined that the authentication certificate is valid, that is, a source of the certificate chain is valid, so that verification is performed step by step according to the authentication certificate. The secure channel is a data transmission channel that can ensure data transmission security. The secure channel is a trusted channel, and may be a data transmission channel established based on the HTTPS protocol.

In an exemplary embodiment, the application server may further obtain an authentication certificate revocation list in advance. In this way, when performing certificate chain authentication, the application server first queries whether the authentication certificate in the certificate chain exists in the authentication certificate revocation list. In a case that the authentication certificate in the certificate chain exists in the authentication certificate revocation list, it indicates that the authentication certificate is invalid, and it is unnecessary to perform subsequent certificate verification. In a case that the authentication certificate in the certificate chain does not exist in the authentication certificate revocation list, subsequent certificate verification is continued to be performed. The authentication certificate revocation list is used for publicly displaying invalid authentication certificates.

In an exemplary embodiment, a verification result that is fed back in a case that the application server does not store the authentication certificate and that is obtained from the certificate authentication server through a secure channel is received. The verification result is obtained by verifying the certificate chain according to an authentication certificate stored in the certificate authentication server after the certificate authentication server receives, through the secure channel, the certificate chain uploaded by the application server.

In a case that the application server does not store the authentication certificate consistent with the authentication certificate in the certificate chain, the application server may transmit the certificate chain to the certificate authentication server or the key management server through the secure channel. The certificate authentication server or the key management server checks the validity of each certificate in the certificate chain, and feeds back the verification result to the application server. Then, the applications server feeds back the verification result to the terminal. A process of checking the validity of each certificate in the certificate chain by the certificate authentication server or the key management server is similar to a process of checking the validity of each certificate in the certificate chain by the application server, and details are not described herein again.

In an exemplary embodiment, the certificate authentication server checks the validity of the certificate, thereby enhancing the credibility of the verification result. In addition, during verification, the verification is performed according to the certificate chain. That is, the device public key is included in the certificate chain, and does not need to be uploaded in advance.

Generally, the application server only checks the validity of the certificate in a scenario with a low security level. In a scenario with a high security level, even if the application server stores the authentication certificate consistent with the authentication certificate in the certificate chain, the application server needs to transmit the certificate chain to the certificate authentication server or the key management server through the secure channel, so that the validity of each certificate in the certificate chain is checked by the certificate authentication server or the key management server. The scenario with a low security level is, for example, a scenario related to account opening; the scenario with a high security level is, for example, a scenario related to resource transfer (payment).

In an exemplary embodiment, after receiving the biometric authentication authorization request triggered by the application, the terminal determines a security level corresponding to an event requesting the biometric authentication authorization, and adds the security level to the generated application certificate verification request. In this way, after receiving the application certificate verification request, the application server determines, according to the security level carried in the application certificate verification request, whether the validity check of the certificate is performed locally or performed by the certificate authentication server or the key management server. The application server configures an acceptable security level in advance. In a case that the security level carried in the application certificate verification request is the acceptable security level of the application server, the application server determines that the validity check of the certificate is performed locally; otherwise, the application server determines that the validity check of the certificate is performed by the certificate authentication server or the key management server.

In an exemplary embodiment, after determining that the validity check of the certificate is performed by the certificate authentication server or the key management server, the application server may forward the application certificate verification request to the certificate authentication server corresponding to the authentication certificate in the certificate chain, or may forward the application certificate verification request to other certificate authentication servers. In this case, the certificate authentication server to which the application certificate verification request is forwarded needs to obtain a true version of the authentication certificate in the certificate chain through the secure channel in advance.

In the exemplary embodiments, in the scenario with a low security level, the application server checks the validity of the certificate. On one hand, the credibility of the verification result can be ensured to a certain extent. On the other hand, risks and time consumption caused by multiple times of data transmission can be further avoided.

Figure 5:
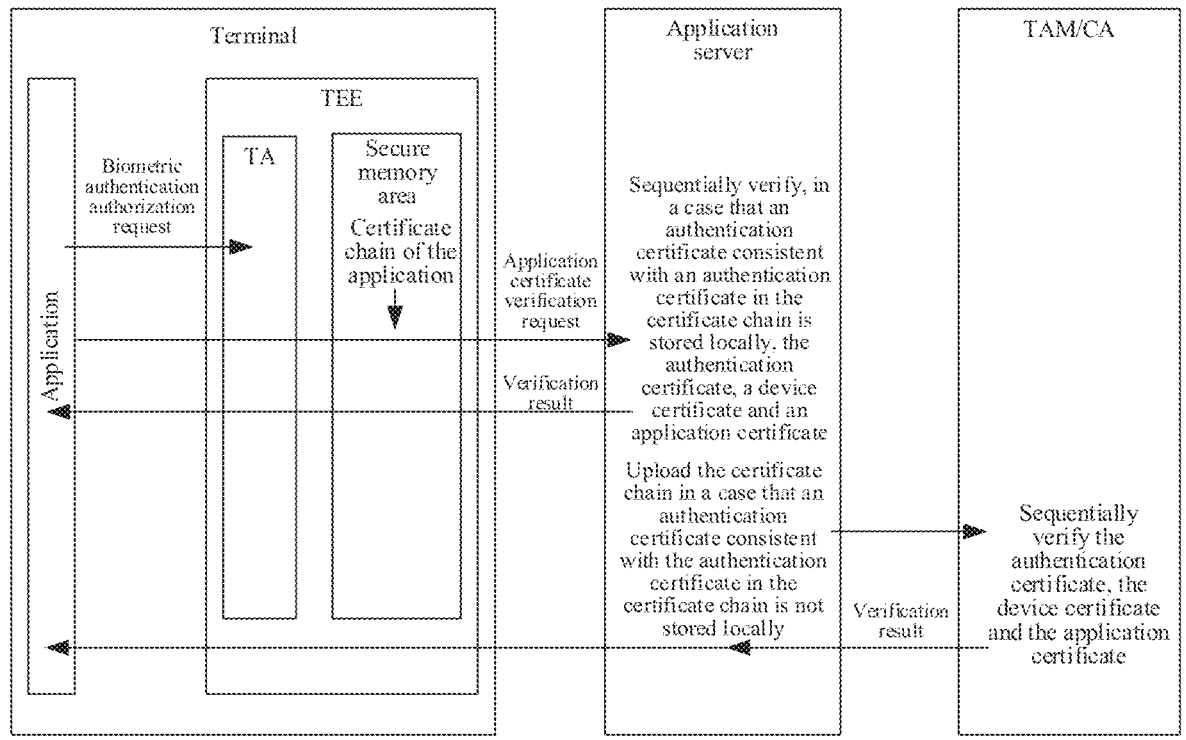
FIG. 5 is a sequence diagram of verifying an application certificate according to an exemplary embodiment of the present disclosure.

FIG. 5 is a sequence diagram of verifying an application certificate in an exemplary embodiment. Referring to FIG. 5, an application may run on the terminal. After running, the application may trigger a biometric authentication authorization request. In a case that the biometric authentication authorization request is detected, the terminal obtains a certificate chain of the application from a secure memory area through a TA running in a TEE, generates an application certificate verification request, and correspondingly transmits the obtained certificate chain and the application certificate verification request to an application server corresponding to the application. After receiving the application certificate verification request, the application server locally queries whether an authentication certificate consistent with the authentication certificate in the certificate chain is stored. If such an authentication certificate exists, the authentication certificate, a device certificate, and the application certificate are verified sequentially, and a verification result is fed back. If such an authentication certificate does not exist, the certificate chain is transmitted to a certificate authentication server (CA) or a key management server (TAM) through a secure channel, and the CA or the TAM sequentially verifies the authentication certificate, the device certificate, and the application certificate, and feeds back the verification result.

Figure 6:
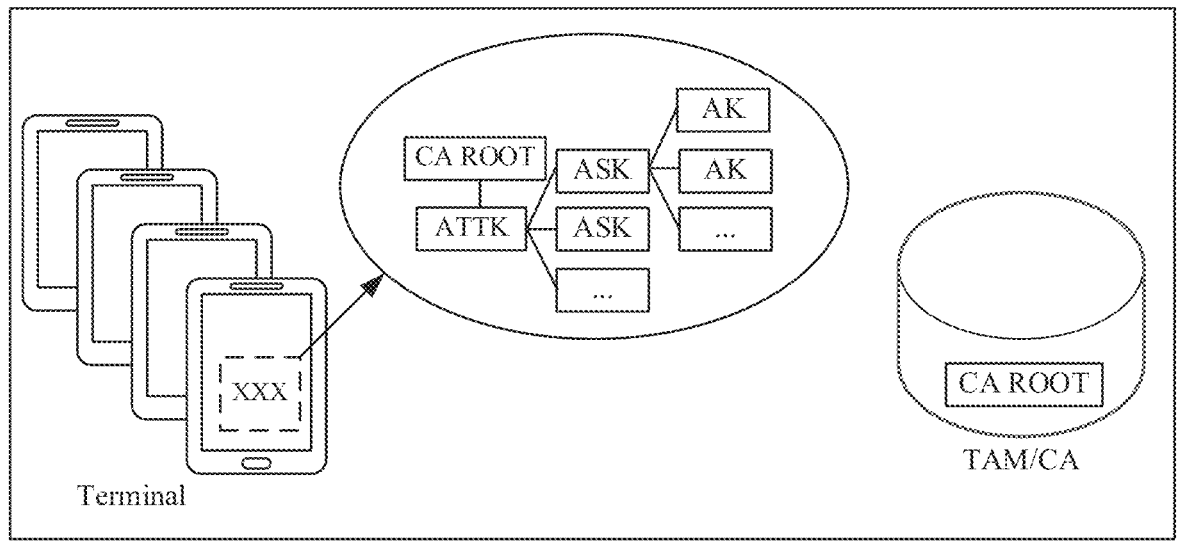
FIG. 6 is a principle architectural diagram of key management according to an exemplary embodiment of the present disclosure.

FIG. 6 is a principle architectural diagram of key management in an exemplary embodiment. Referring to FIG. 6, an authentication certificate (CA ROOT), a device certificate (ATTK) issued by the authentication certificate, an application certificate (ASK) issued by the device certificate, and a service certificate (AK authentication key) issued by the application certificate may be stored in the terminal to form a certificate chain using the authentication certificate (CA ROOT) as a source. The certificate authentication server (CA) or a key management server (TAM) stores the authentication certificate (CA ROOT). In this way, when the validity of the certificates is to be checked subsequently, the terminal uploads the certificate chain of the to-be-verified certificates along with a verification request, so that the validity of the certificates can be checked step by step. The application private key corresponding to the application certificate is used for signing to generate signature data of the service certificate, and the application public key of the application certificate is used for decrypting the signature data of the service certificate. The service key may be an authentication key (AK). The AK is used for checking the validity of a service.

Figure 7:
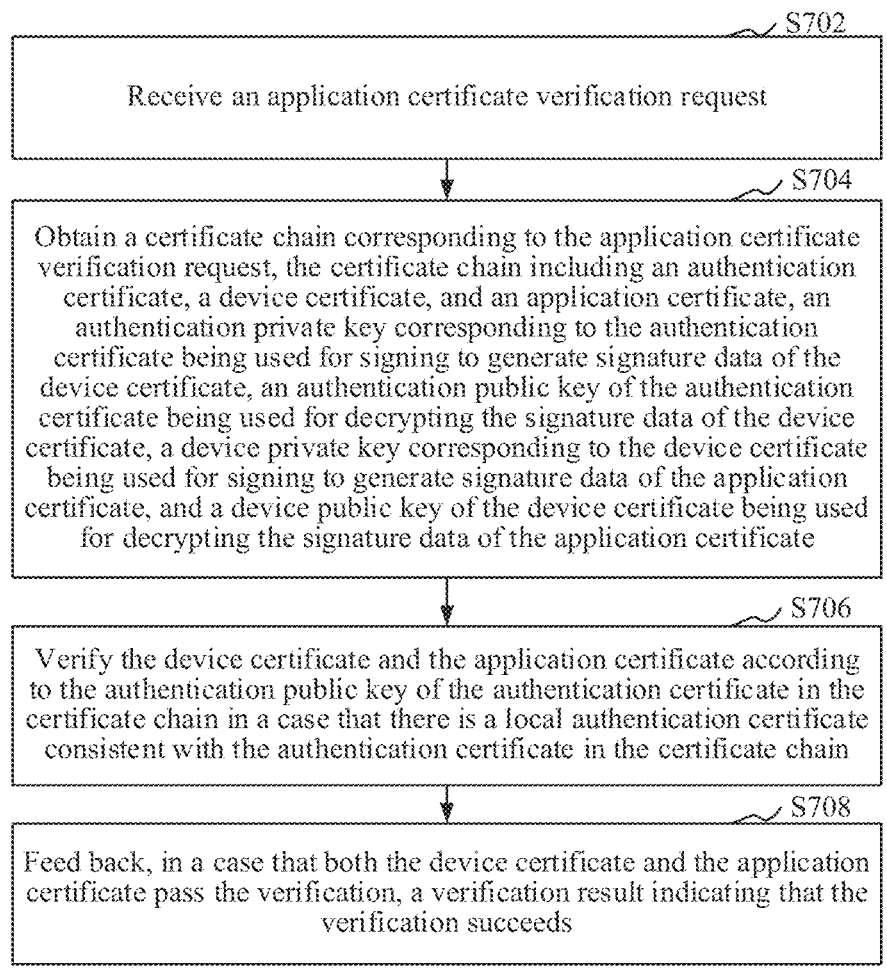
FIG. 7 is a schematic flowchart of a certificate verification method according to an exemplary embodiment of the present disclosure.

FIG. 7 is a schematic flowchart of a certificate verification method in an exemplary embodiment. Description is made in this embodiment by using an example in which the certificate verification method is applied to the server 120 in FIG. 1. Referring to FIG. 7, the certificate verification method includes the following steps.

In step S702, an application certificate verification request is received. In an exemplary embodiment, the server is an application server. The terminal may generate, in a case that a biometric authentication authorization request triggered by an application is received, an application certificate verification request corresponding to the application, and correspondingly transmit a certificate chain of the application and the application certificate verification request to the application server corresponding to the application. In this way, the application server receives the application certificate verification request.

In an exemplary embodiment, the server is a certificate authentication server or a key management server. The application server may forward the application certificate verification request to the certificate authentication server or the key management server through a secure channel in a case that an authentication certificate consistent with an authentication certificate in the certificate chain is not found in the application server. The application server may also forward the application certificate verification request to the certificate authentication server or the key management server through a secure channel when it is determined that a security level carried in the application certificate verification request is higher than a security level acceptable to the application server. In this way, the certificate authentication server or the key management server receives the application certificate verification request.

In step S704, a certificate chain corresponding to the application certificate verification request, the certificate chain including an authentication certificate, a device certificate, and an application certificate is obtained. An authentication private key corresponding to the authentication certificate is used for signing to generate signature data of the device certificate. An authentication public key of the authentication certificate is used for decrypting the signature data of the device certificate, a device private key corresponding to the device certificate is used for signing to generate signature data of the application certificate, and a device public key of the device certificate is used for decrypting the signature data of the application certificate.

After the terminal leaves the factory, next-level certificates are issued step by step in a security zone of the terminal, to ensure that a trust chain is based on the authentication certificate. The certificate chain of each certificate includes not only the certificate itself, but also includes all certificates for issuing the certificate from the source. For example, a certificate chain of a device certificate includes an authentication certificate and a device certificate. A certificate chain of an application certificate includes an authentication certificate, a device certificate, and an application certificate. A certificate chain of a service certificate includes an authentication certificate, a device certificate, an application certificate, and a service certificate.

In step S706, the device certificate and the application certificate are verified according to the authentication public key of the authentication certificate in the certificate chain in a case that there is a local authentication certificate consistent with the authentication certificate in the certificate chain.

In a case that an authentication certificate consistent with the authentication certificate in the certificate chain is stored in the server, it is determined that the authentication certificate in the certificate chain is valid. Then, the server decrypts the signature data of the device certificate according to the authentication public key of the authentication certificate to obtain first digest information, and extracts second digest information of a device parameter and the device public key of the device certificate according to a digest information extraction mode agreed upon with the terminal, to compare the first digest information and the second digest information. When the first digest information is inconsistent with the second digest information, it is determined that the device certificate is invalid, and a verification result indicating that the verification fails is fed back to the terminal. When the first digest information is consistent with the second digest information, the service continues to decrypt the signature data of the application certificate according to the device public key of the device certificate to obtain third digest information, and extracts fourth digest information of an application parameter and the application public key of the application certificate according to the digest information extraction mode agreed upon with the terminal, to compare the third digest information and the fourth digest information. When the third digest information is inconsistent with the fourth digest information, it is determined that the device certificate is invalid, and the verification result indicating that the verification fails is fed back to the terminal. When the third digest information is consistent with the fourth digest information, it is determined that the application certificate is valid, and the verification result indicating that the verification succeeds is fed back to the terminal.

When the server is the application server, the application server obtains the authentication certificate of each certificate authentication server from the certificate authentication servers through a secure channel in advance.

In step S708, in a case that both the device certificate and the application certificate pass the verification, a verification result is fed back to indicate that the verification succeeds. The permission of biometric authentication can be granted to the application only in a case that each certificate in the certificate chain passes the verification. In addition, the permission of biometric authentication cannot be granted to the application as long as any certificate in the certificate chain fails to pass the validity check.

In the foregoing exemplary certificate verification method, when the certificate needs to be verified, the certificate chain corresponding to the application certificate verification request is directly obtained. The authentication private key corresponding to the authentication certificate in the certificate chain is used for signing to generate the signature data of the device certificate, the authentication public key of the authentication certificate is used for decrypting the signature data of the device certificate, the device private key corresponding to the device certificate is used for signing to generate the signature data of the application certificate, and the device public key of the device certificate is used for decrypting the signature data of the application certificate, that is, the device certificate and the application certificate are issued step by step based on the authentication certificate. Therefore, in a case that there is an authentication certificate consistent with the authentication certificate in the certificate chain, that is, when the authentication certificate is determined to be credible, the device certificate and the application certificate may be verified according to the authentication certificate in the certificate chain, to feed back, in a case that both the device certificate and the application certificate pass the verification, the verification result indicating that the verification succeeds, so that the validity and the high efficiency of the certificate verification are ensured.

In an exemplary embodiment, in step S706 the authentication certificate in the certificate chain is queried in an authentication certificate revocation list. In a case that the authentication certificate in the certificate chain does not exist in the authentication certificate revocation list, the authentication certificate consistent with the authentication certificate in the certificate chain is locally queried. The device certificate is verified according to the authentication public key of the authentication certificate in the certificate chain in a case that the authentication certificate consistent with the authentication certificate in the certificate chain is found, and the application certificate is verified according to the device public key of the device certificate in a case that the device certificate passes the verification.

In an exemplary embodiment, a device parameter and the device public key is received, and digest information of the device parameter and the device public key are obtained. The digest information is encrypted using the authentication private key to obtain the signature data, and the device certificate is generated and fed back according to the signature data obtained through encryption. The steps performed by the server in the exemplary embodiment of the certificate verification method have been described above and therefore not repeated here for the sake of brevity.

Both the key management method and the certificate verification method in the exemplary embodiments of this application may be applied to a biometric authentication standard. The biometric authentication standard is, for example, a SOTER standard developed by the applicant. After the methods in the exemplary embodiments of this application are applied to the SOTER standard, the terminal may also be supported by the SOTER standard without uploading device ATTKs to the TAM one by one in the production line in advance, to bring convenience to an original equipment manufacturer (OEM) that adopts SOTER.

It is to be understood that, although the steps in the flowchart of the foregoing exemplary embodiments are sequentially shown according to the indication of arrows, the steps are not necessarily sequentially performed according to the sequence indicated by the arrows. As such, the steps described may be performed concurrently, in an order different than that described, or in reverse order. Each of the described steps may also include sub-steps, as one of ordinary skill would recognize. The sub-steps, which may also be regarded as stages, are not necessarily performed at the same moment but may be performed at different moments. The sub-steps or stages are not necessarily performed sequentially, but may be performed in turn or alternately with another step or at least some of sub-steps or stages of another step. As can be appreciated, one or more of the steps, or sub-steps, may also be omitted without departing from the scope of the present disclosure.

Figure 8:
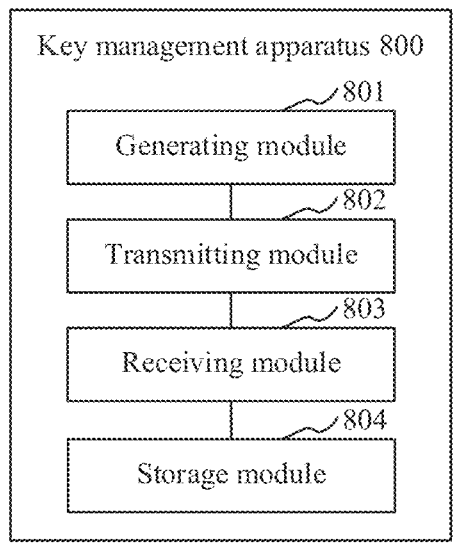
FIG. 8 is a structural diagram of modules of a key management apparatus according to an exemplary embodiment of the present disclosure.

As shown in FIG. 8, in an exemplary embodiment, a key management apparatus 800 is provided. Referring to FIG. 8, the key management apparatus 800 includes a generating module 801, a transmitting module 802, a receiving module 803, and a storage module 804. One of ordinary skill will recognize that these modules may be implemented in hardware using circuitry, such as a processor and memory.

The generating module 801 is configured to generate, in a local security zone, a device key including a device public key and a device private key. The transmitting module 802 is configured to transmit a local device parameter and the device public key to a certificate authentication server. The receiving module 803 is configured to receive a device certificate fed back by the certificate authentication server, signature data of the device certificate being generated by signing the device parameter and the device public key by using an authentication private key of the certificate authentication server. The storage module 804 is configured to store the device private key and the device certificate in the security zone.

In an exemplary embodiment, the generating module 801 is further configured to generate, in a case that an application key generating instruction triggered by an application running locally is obtained, an application key of the application in the security zone, the application key including an application public key and an application private key. The generating module 801 is also configured to generate an application certificate of the application in the security zone by signing an application parameter of the application and the application public key by using the device private key. The storage module 804 is further configured to correspondingly store the application private key and the application certificate in the security zone.

In an exemplary embodiment, the generating module 801 is further configured to obtain digest information of the application parameter of the application and the application public key, encrypt the digest information by using the device private key to obtain signature data, and generate the application certificate of the application according to the signature data obtained through encryption.

In an exemplary embodiment, the storage module 804 is further configured to obtain an authentication certificate including an authentication public key corresponding to the authentication private key, use the authentication certificate, the device certificate and the application certificate as a certificate chain of the application, and store the certificate chain in the security zone.

Figure 9:
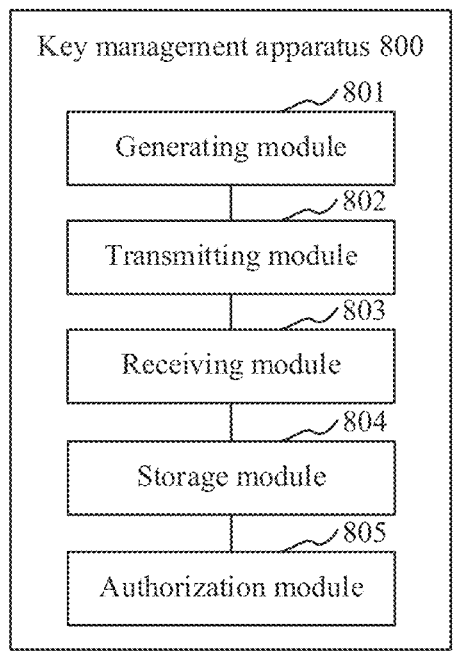
FIG. 9 is a structural diagram of modules of a key management apparatus according to an exemplary embodiment of the present disclosure.

As shown in FIG. 9, in an exemplary embodiment, the key management apparatus 800 further includes an authorization module 805 configured to generate, in a case that a biometric authentication authorization request triggered by the application is received, an application certificate verification request corresponding to the application. The authorization module 805 is also configured to correspondingly transmit the certificate chain of the application and the application certificate verification request to an application server corresponding to the application, receive a verification result fed back by the application server after the application server verifies the received certificate chain according to an authentication certificate stored in the application server, and grant the application a permission of biometric authentication in a case that the verification result indicates that the verification succeeds.

In an exemplary embodiment, the authorization module 805 is further configured to receive a verification result that is fed back in a case that the application server does not store the authentication certificate and that is obtained from the certificate authentication server through a secure channel. The verification result is obtained by verifying the certificate chain according to an authentication certificate stored in the certificate authentication server after the certificate authentication server receives, through the secure channel, the certificate chain uploaded by the application server.

Figure 10:
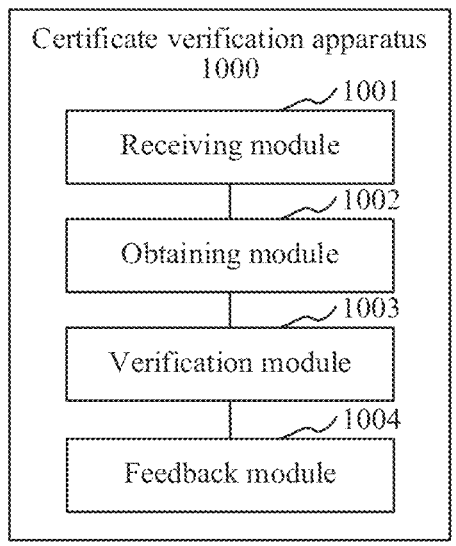
FIG. 10 is a structural diagram of modules of a certificate verification apparatus according to an exemplary embodiment of the present disclosure.

As shown in FIG. 10, in an exemplary embodiment, a certificate verification apparatus 1000 is provided. Referring to FIG. 10, the certificate verification apparatus 1000 includes a receiving module 1001, an obtaining module 1002, a verification module 1003 and a feedback module 1004. As can be appreciated, each of these modules may be implemented as hardware circuitry including, for example, a processor and memory.

The receiving module 1001 is configured to receive an application certificate verification request. The obtaining unit 1002 is configured to obtain a certificate chain corresponding to the application certificate verification request. The certificate chain includes an authentication certificate, a device certificate, and an application certificate, an authentication private key corresponding to the authentication certificate being used for signing to generate signature data of the device certificate, an authentication public key of the authentication certificate being used for decrypting the signature data of the device certificate, a device private key corresponding to the device certificate being used for signing to generate signature data of the application certificate, and a device public key of the device certificate being used for decrypting the signature data of the application certificate.

The verification module 1003 is configured to verify the device certificate and the application certificate according to the authentication public key of the authentication certificate in the certificate chain in a case that there is a local authentication certificate consistent with the authentication certificate in the certificate chain. The feedback module 1004 is configured to feed back, in a case that both the device certificate and the application certificate pass the verification, a verification result indicating that the verification succeeds.

In an exemplary embodiment, the verification module 1003 is further configured to query, in an authentication certificate revocation list, the authentication certificate in the certificate chain, locally query, in a case that the authentication certificate in the certificate chain does not exist in the authentication certificate revocation list, the authentication certificate consistent with the authentication certificate in the certificate chain, verify the device certificate according to the authentication public key of the authentication certificate in the certificate chain in a case that the authentication certificate consistent with the authentication certificate in the certificate chain is found, and verify the application certificate according to the device public key of the device certificate in a case that the device certificate passes the verification.

Figure 11:
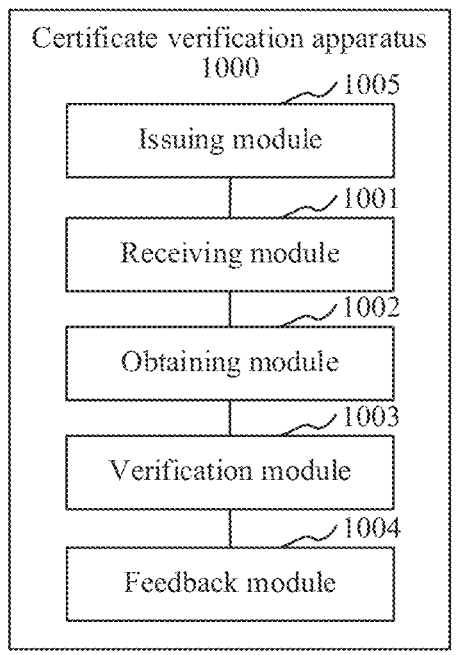
FIG. 11 is a structural diagram of modules of a certificate verification apparatus according to an exemplary embodiment of the present disclosure.

As shown in FIG. 11, in an exemplary embodiment, the certificate verification apparatus 1000 further includes circuitry such as an issuing module 1005, configured to receive a device parameter and the device public key, obtain digest information of the device parameter and the device public key, encrypt the digest information by using the authentication private key to obtain the signature data, and generate and feed back the device certificate according to the signature data obtained through encryption.

Figure 12:
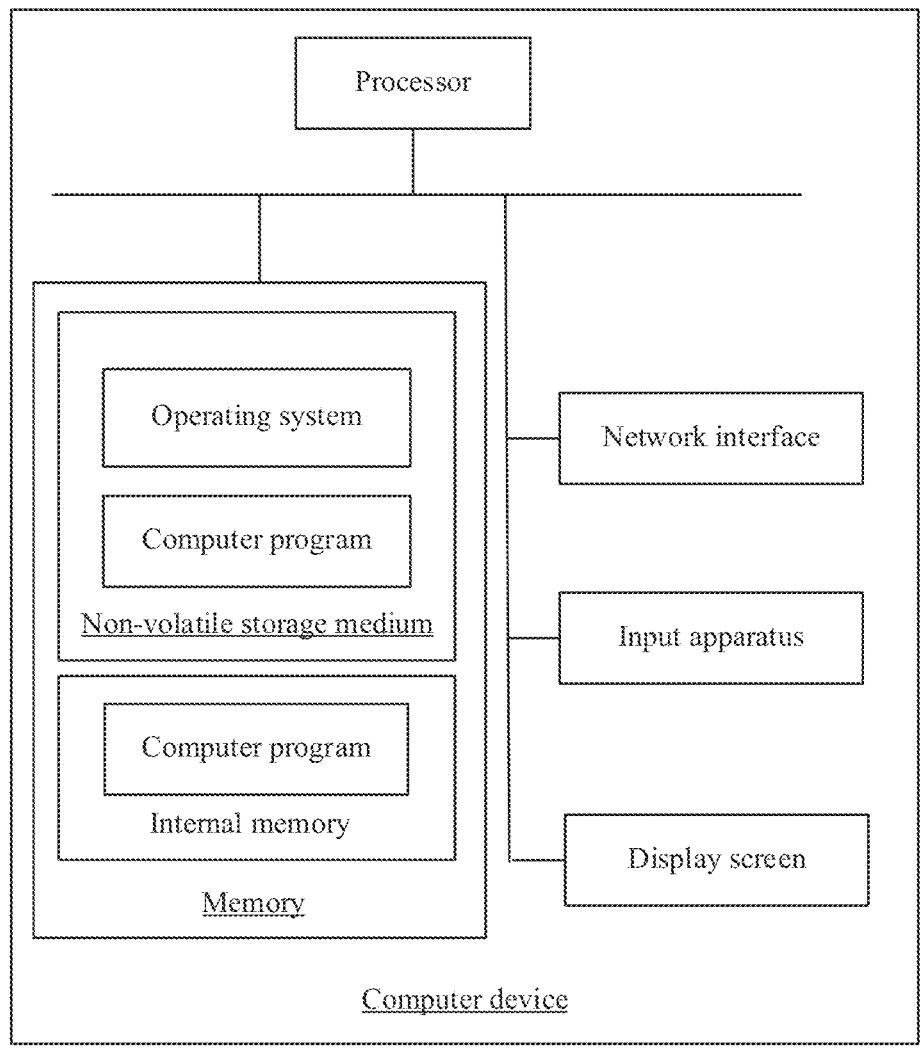
FIG. 12 is a diagram of an internal structure of a computer device according to an exemplary embodiment of the present disclosure.

FIG. 12 is a diagram of an internal structure of a computer device in an exemplary embodiment. The computer device may be the terminal 110 in FIG. 1, As shown in FIG. 12, the computer device includes circuitry such as a processor, a memory, a network interface, an input device and a display screen that are connected through a system bus. The memory includes a non-transitory, non-volatile storage medium and an internal memory. The non-transitory, non-volatile storage medium of the computer device stores an operating system, and may further store a computer program that, when executed by the processor, causes the processor to perform the key management method described herein. The internal memory may also store computer-readable instructions. The computer-readable instructions, when executed by the processor, may cause the processor to perform the key management method as described herein.

The display screen of the computer device may be a liquid crystal display screen or an electronic ink display screen. The input apparatus may be a touch layer covering the display screen, or may be a key, a trackball or a touchpad disposed on a housing of the computer device, or may be an external keyboard, touchpad, mouse, or the like. A person skilled in the art may understand that, the structure shown in FIG. 12 is only a block diagram of an exemplary structure that does not limit the present disclosure. Specifically, any computer device including more or fewer components than those shown in the figure, or including a different combination of components, or a different component deployment may be used without departing from the scope of the present disclosure.

Figure 13:
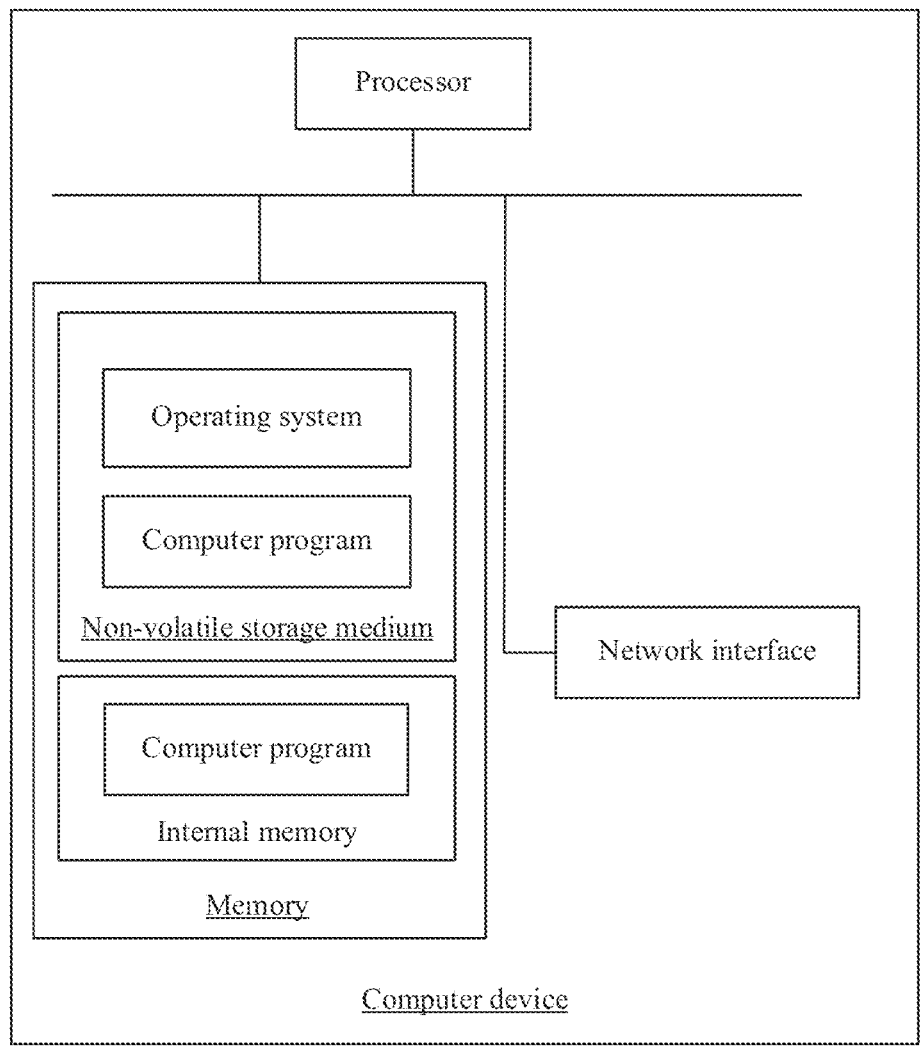
FIG. 13 is a diagram of an internal structure of a computer device according to an exemplary embodiment of the present disclosure.

FIG. 13 is a diagram of an internal structure of a computer device in an exemplary embodiment. The computer device may be the server 120 in FIG. 1. As shown in FIG. 13, the computer device includes circuitry such as a processor, a memory, and a network interface that are connected through a system bus. The memory includes a non-transitory, non-volatile storage medium and an internal memory. The non-transitory, non-volatile storage medium of the computer device stores an operating system, and may further store a computer program that, when executed by the processor, causes the processor to perform the certificate verification method described herein. The internal memory may also store computer-readable instructions. The computer-readable instructions, when executed by the processor, may cause the processor to perform the certificate verification method as described herein. A person skilled in the art may understand that, the structure shown in FIG. 13 is only a block diagram of an exemplary structure and does not limit the present disclosure. Specifically, any computer device including more or fewer components than those shown in the figure, differently arranged components, or a different component deployment may be used without departing from the scope of the present disclosure.

In an exemplary embodiment, both the key management apparatus and the certificate verification apparatus provided in this application may be implemented as a computer program, and the computer program may run on the computer device shown in FIG. 12 or FIG. 13. The non-transitory, non-volatile storage medium of the computer device may store program modules forming the key management apparatus or the certificate verification apparatus, for example, the generating module 801, the transmitting module 802, the receiving module 803, and the storage module 804 shown in FIG. 8. The computer program formed by the program modules cause the processor to perform the steps of the key management method or the certificate verification method described in the embodiments of this application in this specification.

For example, the computer device shown in FIG. 12 may generate, in a local security zone, a device key including a device public key and a device private key by using the generating module 801 in the key management apparatus 800 shown in FIG. 8. A local device parameter and the device public key are transmitted to a certificate authentication server by using the transmitting module 802. A device certificate fed back by the certificate authentication server is received by using the receiving module 803, signature data of the device certificate being generated by signing the device parameter and the device public key by using an authentication private key of the certificate authentication server. The device private key and the device certificate are stored in the security zone by using the storage module 804.

For example, the computer device shown in FIG. 13 may receive an application certificate verification request by using the receiving module 1001 in the certificate verification apparatus 1000 shown in FIG. 10. A certificate chain corresponding to the application certificate verification request is obtained by using the obtaining unit 1002, the certificate chain including an authentication certificate, a device certificate, and an application certificate, an authentication private key corresponding to the authentication certificate being used for signing to generate signature data of the device certificate, an authentication public key of the authentication certificate being used for decrypting the signature data of the device certificate, a device private key corresponding to the device certificate being used for signing to generate signature data of the application certificate, and a device public key of the device certificate being used for decrypting the signature data of the application certificate. The device certificate and the application certificate are verified according to the authentication public key of the authentication certificate in the certificate chain by using the verification module 1003 in a case that there is a local authentication certificate consistent with the authentication certificate in the certificate chain. In a case that both the device certificate and the application certificate pass the verification, a verification result indicating that the verification succeeds is fed back by using the feedback module 1004.

In an exemplary embodiment, a key management system is provided, including a terminal and a certificate authentication server. The terminal generates, in a local security zone, a device key including a device public key and a device private key, and transmits a local device parameter and the device public key to the certificate authentication server. The certificate authentication server feeds back a device certificate to the terminal, signature data of the fed back device certificate being generated by signing, by the certificate authentication server, the device parameter and the device public key by using an authentication private key of the certificate authentication server. The terminal stores the device private key and the device certificate in the security zone.

In an exemplary embodiment, the key management system further includes an application server. The terminal generates a certificate chain of an application running locally, generates, in a case that a biometric authentication authorization request triggered by the application is received, an application certificate verification request corresponding to the application, and correspondingly transmits the certificate chain of the application and the application certificate verification request to the application server corresponding to the application.

The application server feeds back, in a case that an authentication certificate in the certificate chain is stored, a verification result to the terminal after the received certificate chain is verified according to the stored authentication certificate, and transfers the certificate chain to the certificate authentication server through a secure channel in a case that the authentication certificate in the certificate chain is not stored, obtain, from the certificate authentication server, a verification result that is obtained by the certificate authentication server by verifying the certificate chain, and feed back the verification result to the terminal.

The certificate chain includes an authentication certificate, a device certificate, and an application certificate. An authentication private key corresponding to the authentication certificate is used for signing to generate the signature data of the device certificate, and an authentication public key of the authentication certificate is used for decrypting the signature data of the device certificate. A device private key corresponding to the device certificate is used for signing to generate signature data of the application certificate, and a device public key of the device certificate is used for decrypting the signature data of the application certificate.

In an exemplary embodiment, the key management system further includes a key management server. The application server transfers the certificate chain to the certificate key management server through a secure channel in a case that the authentication certificate in the certificate chain is not stored, obtains, from the key management server, a verification result that is obtained by the key management server by verifying the certificate chain, and feeds back the verification result to the terminal.

In an exemplary embodiment, the terminal generates, in a case that an application key generating instruction triggered by an application running locally is obtained, an application key of the application in the security zone, the application key including an application public key and an application private key, generates an application certificate of the application in the security zone by signing an application parameter of the application and the application public key by using the device private key, and correspondingly stores the application private key and the application certificate in the security zone.

In an exemplary embodiment, the terminal obtains digest information of the application parameter of the application and the application public key, encrypts the digest information by using the device private key to obtain signature data, and generates the application certificate of the application according to the signature data obtained through encryption.

In an exemplary embodiment, the terminal obtains an authentication certificate including an authentication public key corresponding to the authentication private key, uses the authentication certificate, the device certificate and the application certificate as a certificate chain of the application, and stores the certificate chain in the security zone.

In an exemplary embodiment, the application server or the key management server or the certificate authentication server queries, in an authentication certificate revocation list, the authentication certificate in the certificate chain, locally queries, in a case that the authentication certificate in the certificate chain does not exist in the authentication certificate revocation list, the authentication certificate consistent with the authentication certificate in the certificate chain. The application server or the key management server, or the certificate authentication server, verifies the device certificate according to the authentication public key of the authentication certificate in the certificate chain in a case that the authentication certificate consistent with the authentication certificate in the certificate chain is found, and verifies the application certificate according to the device public key of the device certificate in a case that the device certificate passes the verification.

In an exemplary embodiment, the certificate authentication server receives a device parameter and the device public key, obtains digest information of the device parameter and the device public key, encrypts the digest information by using the authentication private key to obtain signature data, and generates and feeds back the device certificate according to the signature data obtained through encryption.

In an exemplary embodiment, a non-transitory computer-readable storage medium is provided. The non-transitory computer-readable storage medium stores a computer program that, when executed by a processor, causes the processor to perform steps of the foregoing exemplary method embodiments.

In an exemplary embodiment, a computer device is provided, including circuitry such as a memory and a processor. The memory stores a computer program that, when executed by the processor, causes the processor to perform steps of the foregoing exemplary method embodiments.

A person of ordinary skill in the art will recognize that all or some of processes in the method of the foregoing exemplary embodiments may be implemented by a computer program instructing related hardware. The program may be stored in a non-transitory, non-volatile computer-readable storage medium, and the program, when executed, may include the processes of the foregoing exemplary method embodiments. Any reference to the memory, storage, database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing exemplary embodiments may be combined in ways other than those described herein. For concise description, however, all possible combinations of the technical features in the exemplary embodiments are not described. However, it should be understood that the feature described herein may be combined differently than described without departing from the scope of the present disclosure.

The foregoing exemplary embodiments only show several implementations of this application, and descriptions thereof are in detail, but are not to be understood as a limitation upon the present disclosure. A can be recognized by a person of ordinary skill, variations and improvements may be made without departing from the scope of the present disclosure and the appended claims.

What is claimed is:

1. A key management method performed by a terminal, comprising:
   generating, with circuitry of the terminal and by an application executed in a local security zone, a device key including a device public key and a device private key;
   transmitting, with the circuitry of the terminal, a local device parameter and the device public key to a certificate authentication server;
   receiving, with the circuitry of the terminal, a device certificate fed back by the certificate authentication server, signature data of the device certificate being generated by signing the local device parameter and the device public key by using an authentication private key of the certificate authentication server;
   storing, with the circuitry of the terminal, the device private key and the device certificate in the local security zone;
   generating an application certificate of an application running locally and obtaining an authentication certificate different from the device certificate and the application certificate;
   generating a certificate chain of the application using the authentication certificate, the device certificate, and the application certificate; and
   storing the certificate chain in the local security zone.

2. The method according to claim 1, further comprising:
   generating, when an application key generating instruction triggered by the application running locally is obtained, an application key of the application in the local security zone, the application key including an application public key and an application private key;
   generating the application certificate of the application in the local security zone by signing an application parameter of the application and the application public key by using the device private key; and
   correspondingly storing the application private key and the application certificate in the local security zone.

3. The method according to claim 2, wherein the generating of the application certificate comprises:
   obtaining digest information of the application parameter of the application and the application public key;
   encrypting the digest information by using the device private key to obtain signature data; and
   generating the application certificate of the application according to the signature data.

4. The method according to claim 2, further comprising:
   obtaining the authentication certificate including an authentication public key corresponding to the authentication private key.

5. The method according to claim 4, further comprising:
   generating, when a biometric authentication authorization request triggered by the application is received, an application certificate verification request corresponding to the application;

correspondingly transmitting the certificate chain of the application and the application certificate verification request to an application server corresponding to the application;

receiving a verification result fed back by the application server after verifying the transmitted certificate chain according to an authentication certificate stored in the application server; and granting the application a permission of biometric authentication in response to a determination that the verification result indicates that the verification has succeeded.

6. The method according to claim 5, further comprising: receiving a verification result from the certificate authentication server when the application server does not store the authentication certificate.

7. The method according to claim 6, wherein the verification result is obtained by verifying the certificate chain according to an authentication certificate stored in the certificate authentication server after the certificate authentication server receives, through a secure channel, the certificate chain uploaded by the application server.

8. A certificate verification method performed by a certificate authentication server, comprising:

receiving, with circuitry of the certificate authentication server, an application certificate verification request;

obtaining, with the circuitry of the certificate authentication server, a certificate chain corresponding to the application certificate verification request, the certificate chain comprising an authentication certificate, a device certificate, and an application certificate;

verifying, with the circuitry of the certificate authentication server, the device certificate and the application certificate according to an authentication public key of the authentication certificate in the certificate chain in response to a determination that there is a local authentication certificate consistent with the authentication certificate in the certificate chain; and outputting, with the circuitry of the certificate authentication server and in response to a determination that both the device certificate and the application certificate pass the verification, a verification result indicating that the verification has succeeded, wherein an authentication private key corresponding to the authentication certificate is used to generate signature data of the device certificate, the authentication public key of the authentication certificate is used for decrypting the signature data of the device certificate, a device private key corresponding to the device certificate is used to generate signature data of the application certificate, and a device public key of the device certificate is used for decrypting the signature data of the application certificate.

9. The method according to claim 8, wherein the verifying comprises:

querying, in an authentication certificate revocation list, the authentication certificate in the certificate chain;

locally querying, in response to a determination that the authentication certificate in the certificate chain does not exist in the authentication certificate revocation list, the authentication certificate in the certificate chain;

verifying the device certificate according to the authentication public key of the authentication certificate in the certificate chain in response to a determination that the authentication certificate in the certificate chain is found through local querying; and verifying the application certificate according to the device public key of the device certificate in response to a determination that the device certificate has passed the verification.

10. The method according to claim 8, further comprising:
receiving a device parameter and the device public key;
obtaining digest information of the device parameter and the device public key;
encrypting the digest information by using the authentication private key to obtain signature data; and
generating the device certificate according to the signature data obtained through the encrypting.

11. A key management system, comprising a terminal and a certificate authentication server, wherein the terminal includes circuitry configured to
generate, by an application executed in a local security zone, a device key comprising a device public key and a device private key,
transmit a local device parameter and the device public key to the certificate authentication server;

the certificate authentication server includes circuitry configured to feed back a device certificate to the terminal, signature data of the fed back device certificate being generated by the certificate authentication server by signing the local device parameter and the device public key by using an authentication private key of the certificate authentication server, the terminal storing the device private key and the device certificate in the local security zone; and the circuitry of the terminal is further configured to
generate an application certificate of an application running locally and obtain an authentication certificate different from the device certificate and the application certificate, and
generate a certificate chain of the application using the authentication certificate, the device certificate, and the application certificate, and store the certificate chain in the local security zone.

12. The system according to claim 11, further comprising an application server, wherein the circuitry of the terminal is further configured to generate, when a biometric authentication authorization request triggered by the application is received, an application certificate verification request corresponding to the application, and correspondingly transmit the certificate chain of the application and the application certificate verification request to the application server corresponding to the application; and the application server includes circuitry configured to
feed back, in response to a determination that the authentication certificate in the certificate chain is stored in the application server, a first verification result to the terminal after the transmitted certificate chain is verified according to the stored authentication certificate, and transfer the certificate chain to the certificate authentication server through a secure channel in response to a determination that the authentication certificate in the certificate chain is not stored in the application server, obtain, from the certificate authentication server, a second verification result that is obtained by the certificate authentication server by verifying the certificate chain, and feed back the second verification result to the terminal.

13. The system according to claim 12, wherein
the authentication private key corresponding to the authentication certificate is used to generate the signature data of the device certificate,
an authentication public key of the authentication certificate is used for decrypting the signature data of the device certificate,
the device private key corresponding to the device certificate is used to generate signature data of the application certificate, and
the device public key of the device certificate is used for decrypting the signature data of the application certificate.

14. The system according to claim 11, wherein the circuitry of the terminal is further configured to:
generate, when an application key generating instruction triggered by the application running locally is obtained, an application key of the application in the local security zone, the application key including an application public key and an application private key;
generate the application certificate of the application in the local security zone by signing an application parameter of the application and the application public key by using the device private key; and
correspondingly store the application private key and the application certificate in the local security zone.

15. The system according to claim 14, wherein the circuitry of the terminal is further configured to:
obtain digest information of the application parameter of the application and the application public key;
encrypt the digest information by using the device private key to obtain signature data; and
generate the application certificate of the application according to the signature data.

16. The system according to claim 14, wherein the circuitry of the terminal is further configured to:
obtain the authentication certificate including an authentication public key corresponding to the authentication private key.

17. The system according to claim 12, wherein the circuitry of the terminal is further configured to:
receive a verification result that is fed back from the certificate authentication server in response to a determination that the application server does not store the authentication certificate,
wherein the verification result is obtained by verifying the certificate chain according to an authentication certificate stored in the certificate authentication server after the certificate authentication server receives, through the secure channel, the certificate chain transferred by the application server.

18. A non-transitory computer-readable storage medium encoded with computer-readable instructions that, when executed by a processor, cause the processor to perform a method according to claim 1.

19. A non-transitory computer-readable storage medium encoded with computer-readable instructions that, when executed by a processor, cause the processor to perform a method according to claim 8.

20. The method according to claim 1, wherein the generating the device key and the receiving the device certificate are performed in a secure trusted environment within a device production line.

* * * * *